Aug. 17, 1943.  F. BORTINI  2,326,925
SYSTEM AND DEVICE FOR MEASURING THE QUANTITY
OF AIR SENT OUT IN ONE OR MORE BREATHS
Filed July 1, 1940
*Fig. 1.*
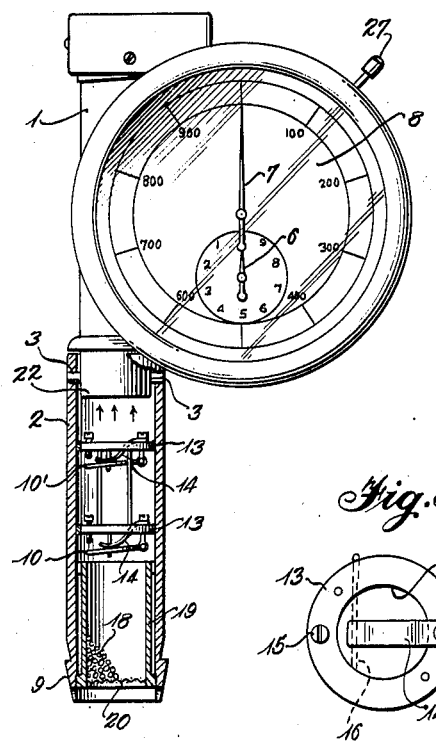
*Fig. 2.*
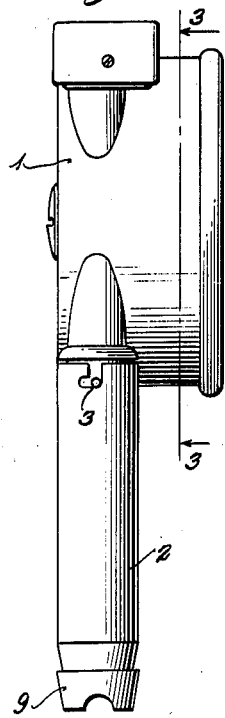
*Fig. 5.*
*Fig. 3.*
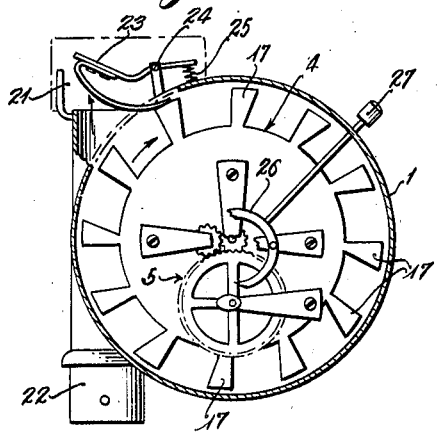
*Fig. 4.*
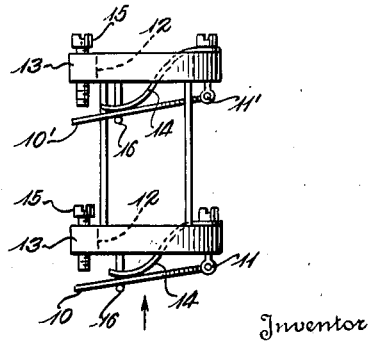
Inventor
*Franco Bortini*
By *Stevens and Davis*
Attorneys Patented Aug. 17, 1943

2,326,925

UNITED STATES PATENT OFFICE 2,326,925

SYSTEM AND DEVICE FOR MEASURING THE QUANTITY OF AIR SENT OUT IN ONE OR MORE BREATHS

Franco Bertini, Pavia, Italy; vested in the Alien Property Custodian

Application July 1, 1940, Serial No. 343,501

3 Claims. (Cl. 128—2.08)

This invention relates to a system for measuring the quantity of air sent out in one or more breaths and a vest-pocket apparatus of high precision realizing this system.

Up to this day complicated, bulky, costly and heavy spirometers have been used for measuring the quantities of air breathed out and this prevented an apparatus of so much diagnostic and therapeutical assistance from being taken by the doctor when visiting his patients and consequently the use on a large scale of this method of controlling human respiration was not possible. The necessity was therefore felt of a high precision vest-pocket spirometer.

This invention refers to a system allowing measuring of the quantity of air breathed out with high precision and allows further to realize the apparatus in a pocket form.

The system is essentially characterised by the fact that the air sent out from the lungs is used to revolve a turning organ located within a small box and this turning organ, by means of a suitable clock work contrivance and hands, marks on a dial the liters of air sent out from the lungs.

The apparatus realizing this system comprises a pipe adapted to convey the air breathed out on a turning element; inside this conveying pipe a system of valves is arranged for the purpose of making practically constant the pressure of the air which is conveyed to the turning organ so that the latter is revolved by the quantity of air conveyed on same, independently of the pressure of said air. For instance, the turning organ drives a clock work contrivance with which hands are connected showing on a dial the quantity of air conveyed on the turning organ. To obtain as exact signalling as possible, a braking system is also provided on the opposite side of the intake pipe, which frees the turning organ as soon as the air enters the apparatus and slows and brakes said turning organ as soon as the air stops going through.

The turning organ is made of light material for the purpose of having the least dead weight. To avoid having any impurities and moisture deposit on the turning organ thereby making it heavy, purifying material is arranged in the conveying pipe, which, either physically or chemically, keeps back moisture and other impurities of air. For instance, glass wool may be used for this purpose.

The annexed drawing shows one form of embodiment of the vest-pocket spirometer forming object of this invention, as an example.

Fig. 1 is a front view of the apparatus with the conveying pipe in section,

Fig. 2 is the side view of the apparatus,

Fig. 3 is a section according to line 3—3 of Fig. 2,

Fig. 4 shows, on a larger scale, the particular of the valves arranged in the conveying pipe, and Fig. 5 is the cross section of Fig. 4.

In the drawing: 1 shows the round shaped box of the apparatus and 2 is the conveying pipe for the air, which is coupled to said box by means of a bayonet cap 3, for instance, 4 is the turning organ with blades 17, 5 indicates diagrammatically the clock work contrivance, which is driven by the turning organ and which operates the hands 6 and 7; 8 is the dial, 9 is a reduced portion of the conveying pipe allowing detachable fixing of a mouthpiece, for instance of glass. The valves arranged in the conveying pipe, whose purpose is that of keeping constant the pressure of the air conveyed to the turning organ, consist essentially of two rings 13 spaced from one another and having each a passage hole 12; the plates 10, 10' are fixed on these rings at points 11, 11' so as to oscillate about these points and they are stressed by springs 14 to keep the two passages 12 open; the positions of the plates 10, 10' are confined by stops 15 and 16 in the one and in the other direction.

A pipe shaped casing 19 is further arranged in the conveying pipe and it is closed at the front by means of net 20; it contains a substance 18 for purifying the air from moisture, either physically or chemically, such as, for instance, glass wool.

The exit opening 21 is in front of air intake opening 22, this exit opening is controlled by a valve and braking device consisting of a spring leaf 23 pivoted at 24 and slightly pressed by spring 25.

An ordinary device to bring the hands to zero is represented by 26 and 27.

The apparatus operates as follows:

The breathed air goes in from the mouthpiece attached at 9, passes through the purifying substance 18, then through the two valves 10, 10' and enters the chamber where the turning organ 4 is located. It revolves the latter and consequently drives the clockwork contrivance 5 to which the hands 6 and 7 are coupled.

The air stresses the two plates 10 and 10'; pressing them against stops 15 and therefore in the space between the two plates 10 and 10' there is practically always a constant pressure of air for any quantity of air passing through. The air therefore reaches the turning organ with a constant pressure and makes it to revolve in accordance with the quantity of air passing through and not in accordance with the pressure of same.

The braking device arranged at the opposite side controls beginning and stopping of the movement of the turning organ. At the beginning of the passage of the air, the air raises plate 23 thereby opening the exit opening and raising the spring leaf resting on the blades of the turning organ so that it is free to revolve. As soon as the air passage stops, plate 23, stressed by spring 25, closes exit 21 and at the same time it brakes and stops the turning organ. In this way the greatest possible exactness is obtained in measuring the quantity of air which has passed through the apparatus. This quantity can be easily read on dial 8 of the apparatus where the small hand indicates the liters and the large hand the fractions of a liter of measured air.

The hands may be returned to zero by pressing button 27.

What I claim is:

1. In a spirometer, a breath driven rotor, a conduit for supplying breath thereto, said conduit including a mouthpiece, normally open valve means in said conduit between said mouthpiece and said rotor for maintaining a constant pressure gas flow of predetermined value between the same and said rotor regardless of the pressure between said mouthpiece and said means, rotor driven means for recording the number of rotations of said rotor in terms of volume of breath, the latter being a function of the former, braking means normally immobilizing said rotor, and means responsive to the pressure in said conduit between said pressure control means and said rotor for releasing said braking means when said predetermined pressure value is attained.

2. In a spirometer, a breath driven rotor, a conduit for supplying breath thereto, said conduit including a mouthpiece, means in said conduit between said mouthpiece and said rotor for maintaining a constant pressure gas flow between the same and said rotor regardless of the pressure between said mouthpiece and said means, said means comprising a pair of valves, means for limiting the maximum and minimum flow therethrough, springs normally biasing said valves to the maximum flow position, the surface of said valves lying in the path of gas flow through said conduit so that the valves may be urged toward the minimum position thereby, and rotor driven means for recording the number of rotations of said rotor in terms of volume of breath, the latter being a function of the former.

3. In a spirometer, a breath driven rotor, a conduit for supplying breath thereto, said conduit including a mouthpiece, means in said conduit between said mouthpiece and said rotor for maintaining a constant pressure gas flow between the same and said rotor regardless of the pressure between said mouthpiece and said means, said means comprising a pair of valves, adjustable means for limiting the minimum flow therethrough, means for limiting the maximum flow therethrough, springs normally biasing said valves to the maximum flow position, the surface of said valves lying in the path of gas flow through said conduit so that the valves may be urged toward the minimum position thereby, and rotor driven means for recording the number of rotations of said rotor in terms of volume of breath, the latter being a function of the former.

FRANCO BORTINI.